(12) United States Patent
Chung et al.

(10) Patent No.: US 10,403,886 B2
(45) Date of Patent: Sep. 3, 2019

(54) ANODE MATERIAL FOR SECONDARY BATTERY, SECONDARY BATTERY INCLUDING THE ANODE MATERIAL AND METHOD FOR PREPARING THE ANODE MATERIAL

(71) Applicant: KOREA INSTITUTE OF SCIENCE AND TECHNOLOGY, Seoul (KR)

(72) Inventors: Kyung Yoon Chung, Seoul (KR); Ji-Hoon Lee, Seoul (KR); Ghulam Ali, Seoul (KR); Hun-Gi Jung, Seoul (KR); Wonchang Choi, Seoul (KR); Won Young Chang, Seoul (KR); Si Hyoung Oh, Seoul (KR); Byung Won Cho, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 60 days.

(21) Appl. No.: 15/396,752

(22) Filed: Jan. 2, 2017

(65) Prior Publication Data
US 2018/0034044 A1   Feb. 1, 2018

(30) Foreign Application Priority Data
Jul. 26, 2016   (KR) .................. 10-2016-0094785

(51) Int. Cl.
*H01M 4/36*   (2006.01)
*H01M 4/38*   (2006.01)
(Continued)

(52) U.S. Cl.
CPC ........... *H01M 4/364* (2013.01); *H01M 4/136* (2013.01); *H01M 4/1397* (2013.01);
(Continued)

(58) Field of Classification Search
CPC ..... H01M 2004/027; H01M 2004/021; H01M 4/582; H01M 4/583; H01M 4/388; H01M 4/387; H01M 10/00
USPC .................. 429/218.1, 232, 231.4, 231.8
See application file for complete search history.

(56) References Cited

U.S. PATENT DOCUMENTS

| | | | |
|---|---|---|---|
| 9,627,722 B1* | 4/2017 | Fan .................... | H01M 10/613 |
| 2010/0060971 A1* | 3/2010 | Schwendeman ........ | G02F 1/155 |
| | | | 359/265 |

(Continued)

FOREIGN PATENT DOCUMENTS

| KR | 20080093243 A | * 10/2008 |
|---|---|---|
| KR | 10-2014-0025349 A | 3/2014 |

(Continued)

OTHER PUBLICATIONS

Machine translation of KR 2008-0093243 (no date).*

(Continued)

*Primary Examiner* — Amanda C. Walke
(74) *Attorney, Agent, or Firm* — Goldilocks Zone IP Law

(57) ABSTRACT

Disclosed is an anode material for a sodium secondary battery. The anode material includes a tin fluoride-carbon composite composed of a tin fluoride and a carbonaceous material. The anode material can be used to improve the charge/discharge capacity, charge/discharge efficiency, and electrochemical activity of a sodium secondary battery. Also provided are a method for preparing the anode material and a sodium secondary battery including the anode material.

4 Claims, 7 Drawing Sheets

(51) Int. Cl.
  *H01M 4/58* (2010.01)
  *H01M 4/587* (2010.01)
  *H01M 4/136* (2010.01)
  *H01M 4/1397* (2010.01)
  *H01M 4/62* (2006.01)
  *H01M 10/054* (2010.01)
  *H01M 4/02* (2006.01)

(52) U.S. Cl.
  CPC ........... *H01M 4/387* (2013.01); *H01M 4/388* (2013.01); *H01M 4/582* (2013.01); *H01M 4/587* (2013.01); *H01M 4/625* (2013.01); *H01M 10/054* (2013.01); *H01M 2004/021* (2013.01); *H01M 2004/027* (2013.01)

(56) References Cited

U.S. PATENT DOCUMENTS

| | | | | |
|---|---|---|---|---|
| 2012/0052299 | A1* | 3/2012 | Fan | H01M 4/485 428/402 |
| 2014/0335395 | A1* | 11/2014 | Ramasubramanian | H01M 2/16 429/142 |
| 2015/0280220 | A1* | 10/2015 | Ikeda | H01M 4/136 429/342 |
| 2017/0028476 | A1* | 2/2017 | Kovalenko | B22F 1/0018 |
| 2018/0019505 | A1* | 1/2018 | Fan | H01M 4/525 |

FOREIGN PATENT DOCUMENTS

| | | | |
|---|---|---|---|
| KR | 10-2015-0141254 A | 12/2015 | |
| KR | 10-2016-0048504 A | 5/2016 | |
| WO | WO-2008126968 A1 * | 10/2008 | ......... H01M 4/0404 |

OTHER PUBLICATIONS

Sofiane Bouazza et al, Preparation and electrochemical properties of nano-sized $SnF_2$ as negative electrode for lithium-ion batteries, Materials Letters 65 , Feb. 17, 2011, pp. 1334-1336.

* cited by examiner

ANODE MATERIAL FOR SECONDARY BATTERY, SECONDARY BATTERY INCLUDING THE ANODE MATERIAL AND METHOD FOR PREPARING THE ANODE MATERIAL

CROSS-REFERENCE TO RELATED APPLICATIONS

This application claims, under 35 U.S.C. § 119, the priority of Korean Patent Application No. 10-2016-0094785 filed on Jul. 26, 2016 in the Korean Intellectual Property Office, the disclosure of which is incorporated herein by reference in its entirety.

BACKGROUND OF THE INVENTION

Field of the Invention

The present invention relates to an anode material that can be used to improve the electrochemical performance of a secondary battery, a secondary battery including the anode material, and a method for preparing the anode material.

Description of the Related Art

The increasing price of lithium as a raw material and the regional distribution of the raw material are clear factors limiting the development of conventional lithium secondary batteries. Due to this limitation, sodium secondary batteries employing sodium for battery driving have recently received attention as alternatives to lithium secondary batteries because sodium is inexpensive and abundant in Earth's crust. Furthermore, since sodium belongs to the same group of alkali metals as lithium, sodium secondary batteries share many features in common with lithium secondary batteries in their driving principle and have great utility in that conventional methods for the fabrication of lithium secondary batteries are also applicable to the fabrication of sodium secondary batteries.

Energy storage systems are currently in the spotlight as solutions to power shortages. Energy storage systems refer to systems for storing surplus energy from power plants, such as wind power, tidal power, solar heat power, water power, and thermal power plants, in a time zone where the energy demand is not concentrated. The success of such systems depends on whether high capacity is achieved at the lowest possible cost. Lithium secondary batteries are widely applied to portable devices based on their high energy density and output characteristics. However, high fabrication costs of lithium secondary batteries are obstacles to their application to high-capacity energy storage systems for electric power demand. Although sodium secondary batteries undergo a small reduction in energy storage density resulting from a voltage drop of 0.3 V compared to existing lithium secondary batteries, they can achieve higher capacity for their fabrication cost than lithium secondary batteries. Due to this advantage, sodium secondary batteries can be used as optimal energy storage devices for next-generation energy storage systems.

Extensive research efforts have been made to develop cathode materials for sodium secondary batteries by replacing lithium, which is the alkali element of cathode materials widely used in lithium secondary batteries, with sodium. In contrast, anode materials (e.g., silicon and graphite) for existing lithium batteries have many problems in terms of performance and stability, greatly limiting their application to sodium batteries.

Thus, there is a need to develop novel anode materials that can be used in sodium secondary batteries.

PRIOR ART DOCUMENTS

Patent Documents

Korean Patent Publication No. 2014-0025349
Korean Patent Publication No. 2015-0141254

SUMMARY OF THE INVENTION

The present invention has been made in view of the above problems, and one object of the present invention is to provide an anode material that allows a sodium secondary battery to exhibit high charge/discharge capacity, excellent cycle life characteristics, and high rate performance.

A further object of the present invention is to provide a method for preparing the anode material.

Another object of the present invention is to provide an anode for a sodium secondary battery including the anode material.

Another object of the present invention is to provide a sodium secondary battery including the anode material.

Still another object of the present invention is to provide a device including the anode material.

One aspect of the present invention provides an anode material for a sodium secondary battery including a tin fluoride-carbon composite composed of a tin fluoride and a carbonaceous material.

A further aspect of the present invention provides a method for preparing an anode material for a sodium secondary battery, including mixing a tin fluoride with a carbonaceous material under an inert atmosphere.

Another aspect of the present invention provides an anode for a sodium secondary battery including the anode material.

Another aspect of the present invention provides a sodium secondary battery including the anode material.

Yet another aspect of the present invention provides a device including the anode material.

The presence of the tin fluoride-carbon composite in the anode material of the present invention allows the sodium secondary battery to exhibit high charge/discharge capacity, excellent cycle life characteristics, and high rate performance.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1A:
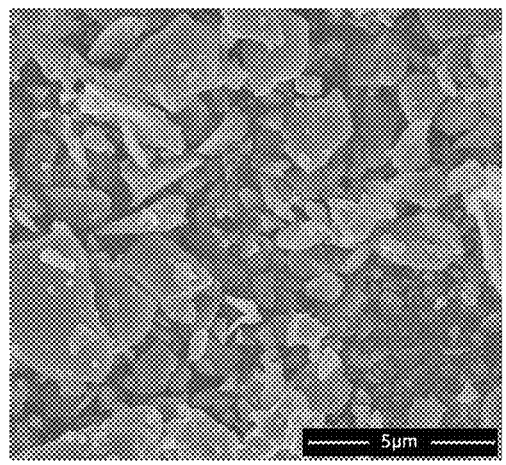
FIGS. 1A to 1C show a scanning electron microscopy image of stannous fluoride ($SnF_2$) used in Comparative Example 1 and scanning electron microscopy images of a stannous fluoride-carbon composite ($SnF_2/C$) prepared in Example 1.

The present invention will now be described in more detail with reference to the accompanying drawings.

One aspect of the present invention is directed to an anode material for a sodium secondary battery including a tin fluoride-carbon composite composed of a tin fluoride and a carbonaceous material.

According to one embodiment, the tin fluoride may be selected from $SnF_2$, $SnF_3$, $SnF_4$, and mixtures thereof. Any tin fluoride that can improve the charge/discharge capacity of sodium secondary batteries may be extensively used.

According to a further embodiment, the carbonaceous material may be selected from acetylene black, denka black, graphite, carbon nanotubes, and mixtures thereof.

The complexation of the carbonaceous material with the tin fluoride can lead to improvements in the electrical conductivity of the anode material and the output characteristics of a sodium secondary battery including the anode material.

According to another embodiment, the tin fluoride-carbon composite may have a size of 50 to 200 nm. The particle size of the tin fluoride is in the range of 1 to 5 μm before ball milling but the particle size of the composite produced by ball milling of a mixture of the tin fluoride and the carbonaceous material is reduced to the range of 50 to 200 nm.

According to another embodiment, the tin fluoride-carbon composite may include 5 to 30% by weight of the carbonaceous material and 70 to 95% by weight of the tin fluoride. If the content of the carbonaceous material is less than 5% by weight, the electrical conductivity of the anode material may decrease and the output characteristics of a battery including the anode material may deteriorate. Meanwhile, if the content of the carbonaceous material exceeds 30% by weight (i.e. if the relative content of the tin fluoride is low), the charge/discharge capacity of a battery including the anode material may deteriorate. If the content of the tin fluoride is less than 70% by weight, the charge/discharge capacity of a battery including the anode material may deteriorate. Meanwhile, if the content of the tin fluoride exceeds 95% by weight (i.e. if the relative content of the carbonaceous material is low), the electrical conductivity of the anode material may decrease and the output characteristics of a battery including the anode material may deteriorate.

A further aspect of the present invention is directed to a method for preparing an anode material for a sodium secondary battery, including mixing and grinding a tin fluoride and a carbonaceous material under an inert atmosphere.

According to one embodiment, the inert atmosphere may be created by at least one inert gas selected from argon, nitrogen, helium, and neon.

According to another embodiment, the mixing and grinding may be performed by ball milling.

The ball milling enables the formation of the tin fluoride-carbon composite in which the tin fluoride and the carbonaceous material with reduced particle diameters are mixed. The reduced particle diameters ensure better access of the composite to an electrolyte, contributing to an improvement in electrochemical activity.

According to another embodiment, the tin fluoride may be prepared by (i) immersing a tin precursor in a fluorine-containing ionic liquid to obtain a precipitate and (ii) drying the precipitate.

Another aspect of the present invention is directed to a method for preparing a $SnF_2/C$ complex, including (A1) drying $SnF_2$ under vacuum at 70 to 90° C. for 20 to 30 hours and (A2) subjecting a mixture of 70 to 95% by weight of the $SnF_2$ and 5 to 30% by weight of acetylene black to ball milling with zirconia balls at 250 to 350 rpm under an argon atmosphere for 5 to 7 hours.

Another aspect of the present invention is directed to a method for preparing an anode material for a sodium secondary battery, including (A1) drying $SnF_2$ under vacuum at 70 to 90° C. for 20 to 30 hours, (A2) subjecting a mixture of 70 to 95% by weight of the $SnF_2$ and 5 to 30% by weight of acetylene black to ball milling with zirconia balls at 250 to 350 rpm under an argon atmosphere for 5 to 7 hours to prepare a $SnF_2/C$ composite, (B1) mixing the $SnF_2/C$ complex with polyvinylidene fluoride in a weight ratio of 8.5-9.5:0.5-1.5, and (B2) adding N-methylpyrrolidone to the mixture obtained in (B1), coating the resulting mixture on a copper (Cu) foil current collector, drying the coated current collector at 75 to 85° C. for 3 to 5 hours, followed by rolling.

It was found that, unlike anode materials for lithium secondary batteries, when the anode material of the present invention fails to meet any one of the following requirements, its performance is significantly deteriorated.

(1-1) $SnF_2$ as the tin fluoride and acetylene black as the carbonaceous material should be used to prepare a composite.

(1-2) $SnF_2$ should be dried under vacuum at 70 to 90° C. for 20 to 30 hours before ball milling.

(1-3) 70 to 95% by weight of $SnF_2$ and 5 to 30% by weight of acetylene black should be subjected to ball milling.

(1-4) Ball milling should be performed using zirconia balls under an argon atmosphere at 250 to 350 rpm for 5 to 7 hours.

(2-1) The SnF$_2$/C composite should be mixed with polyvinylidene fluoride (PVDF) in a weight ratio of 8.5-9.5:0.5-1.5 to produce an anode.

(2-2) N-methylpyrrolidone (NMP) should be added to the mixture obtained in (2-1) and the resulting mixture should be coated on a copper (Cu) foil current collector.

(2-3) The coated current collector should be dried at 75 to 85° C. for 3 to 5 hours, followed by rolling.

Particularly, it was found that only when these requirements are met simultaneously can the performance of the anode material be markedly improved. It was also found that when any one of the requirements is not met, significantly improved performance of the anode material cannot be expected.

Another aspect of the present invention is directed to an anode for a sodium secondary battery including the anode material.

Another aspect of the present invention provides a sodium secondary battery including the anode material.

Yet another aspect of the present invention provides a device including the anode material.

The term "device" as used herein is intended to include portable electronic devices, transportation units, and power devices, but is not limited thereto. Examples of the portable electronic devices include, but are not limited to, cellular phones, notebook computers, and digital cameras. Examples of the transportation units include, but are not limited to, electric vehicles, hybrid electric vehicles, and plug-in hybrid electric vehicles. Examples of the power devices include, but are not limited to, electrical energy storage systems.

EXAMPLES

The present invention will be explained in more detail with reference to the following examples. However, these examples are not to be construed as limiting or restricting the scope and disclosure of the invention. It is to be understood that based on the teachings of the present invention including the following examples, those skilled in the art can readily practice other embodiments of the present invention whose experimental results are not explicitly presented.

Example 1: Preparation of Anode Material for Sodium Secondary Battery and Production of Anode Including the Anode Material SnF$_2$ was dried under vacuum at 80° C. for 24 h. 75 wt % of the SnF$_2$ and 25 wt % of acetylene black were ground and mixed by ball milling with zirconia balls at 300 rpm under an argon atmosphere for 6 h. As a result of the ball milling, SnF$_2$/C was prepared.

The SnF$_2$/C was mixed with polyvinylidene fluoride (PVDF) in a weight ratio of 9:1. To the mixture was added N-methylpyrrolidone (NMP) in such an amount that the weight ratio of the N-methylpyrrolidone (NMP) to the SnF$_2$/C was 9:1. The resulting mixture was coated on a copper (Cu) foil current collector. The coated current collector was dried at 80° C. for 4 h, followed by rolling to produce an anode for a sodium secondary battery.

Comparative Example 1: Preparation of Stannous Fluoride (SnF$_2$) and Production of Anode Including the Stannous Fluoride The procedure of Example 1 was repeated except that commercially available stannous fluoride (SnF$_2$) having a particle diameter of several to several tens of micrometers was used instead of SnF$_2$/C.

Test Example 1: Measurement of Electrochemical Performance

A coin cell or a pouch cell was used to evaluate the electrochemical characteristics of the anode including the stannous fluoride-carbon composite (SnF$_2$/C). Sodium (Na) foils were used as counter and reference electrodes and a solvent of propylene carbonate (PC), ethylene carbonate (EC), and diethyl carbonate (DEC) (1:1:1, v/v/v) was used as an electrolyte. The electrochemical properties were evaluated in the voltage range of 0.01-2.0 V. The coin cell or pouch cell was fabricated in a glove box where both moisture and oxygen were controlled to ≤0.1 ppm.

Figure 1B:
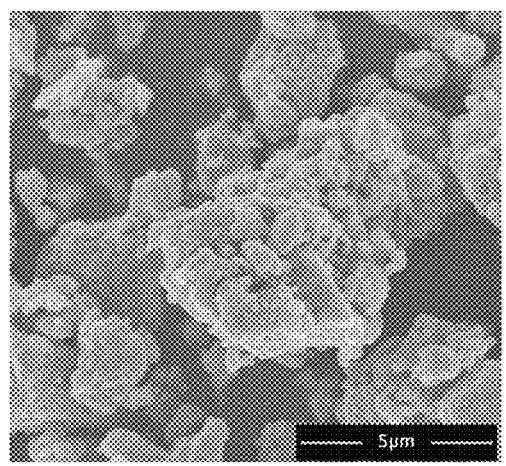
Figure 1C:
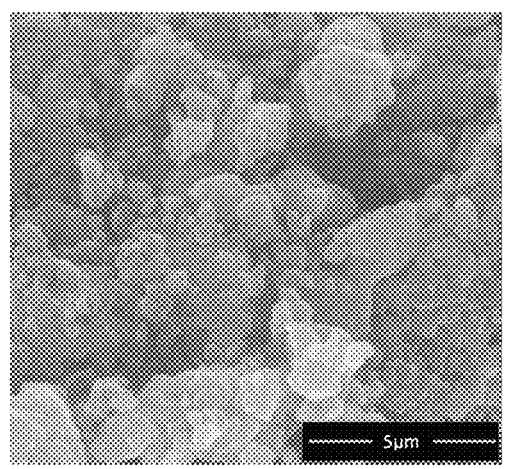

FIGS. 1A to 1C show a scanning electron microscopy image of the stannous fluoride (SnF$_2$) used in Comparative Example 1 and scanning electron microscopy images of the stannous fluoride-carbon composite (SnF$_2$/C) prepared in Example 1.

Specifically, FIG. 1A is a scanning electron microscopy image of the SnF$_2$ used in Comparative Example 1. Referring to FIG. 1A, the SnF$_2$ had a particle diameter of several to several tens of micrometers.

FIG. 1B is a scanning electron microscopy image of the SnF$_2$/C prepared in Example 1. Referring to FIG. 1B, the SnF$_2$/C had a particle diameter of ≤500 nm and a structure in which the SnF$_2$ and the carbonaceous material were piled thick one over another.

FIG. 1C is a higher magnification image of the composite shown in FIG. 1B. The same results were obtained from both images.

Figure 2A:
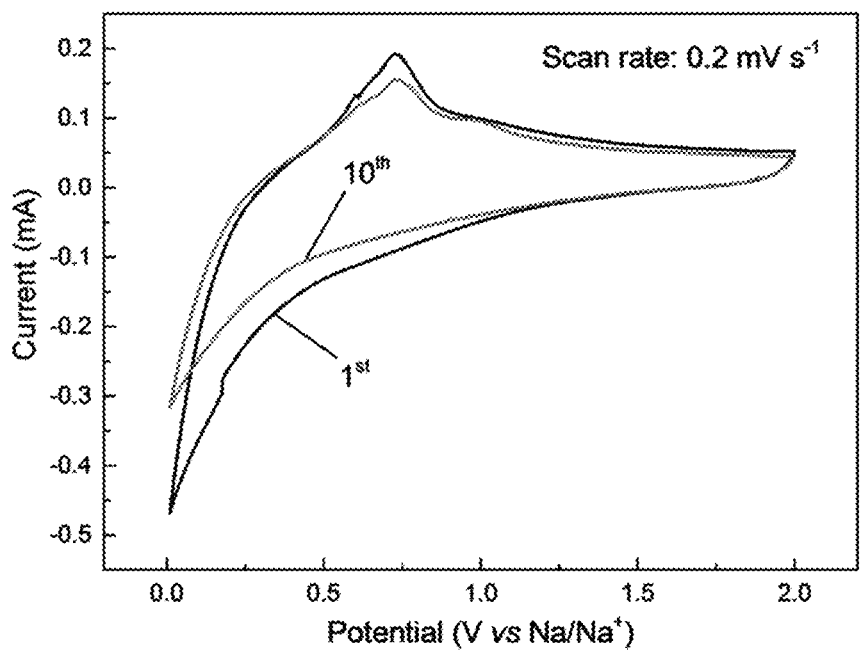
FIGS. 2A and 2B show cyclic voltammograms of an anode including stannous fluoride ($SnF_2$) produced in Comparative Example 1 and an anode including a stannous fluoride-carbon composite ($SnF_2/C$) produced in Example 1.
Figure 2B:
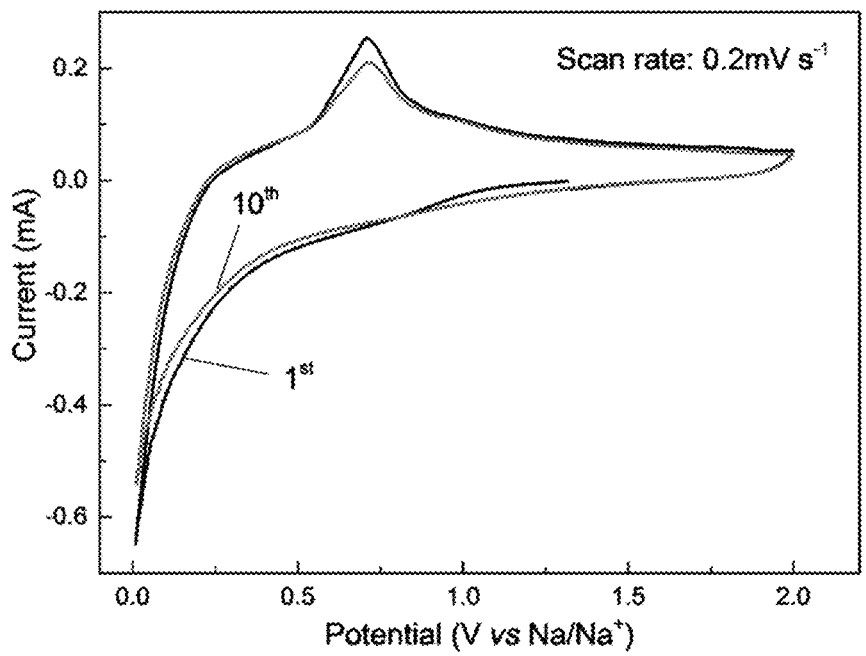

FIGS. 2A and 2B show cyclic voltammograms of the anode including the stannous fluoride (SnF$_2$) produced in Comparative Example 1 and the anode including the stannous fluoride-carbon composite (SnF$_2$/C) produced in Example 1 at a scan rate of 0.2 mVs$^{-1}$.

Specifically, FIG. 2A shows the results of cyclic voltammetry for the anode including the stannous fluoride (SnF$_2$) produced in Comparative Example 1 and FIG. 2B shows the results of cyclic voltammetry for the anode including the stannous fluoride-carbon composite (SnF$_2$/C) produced in Comparative Example 1. In both FIGS. 2A and 2B, oxidation peaks were detected at around of 0.7 V. However, the oxidation peak current measured in the SnF$_2$/C anode of Example 1 was higher than that measured in the SnF$_2$ anode of Comparative Example 1, indicating higher electrochemical activity of the SnF$_2$/C anode.

Figure 3:
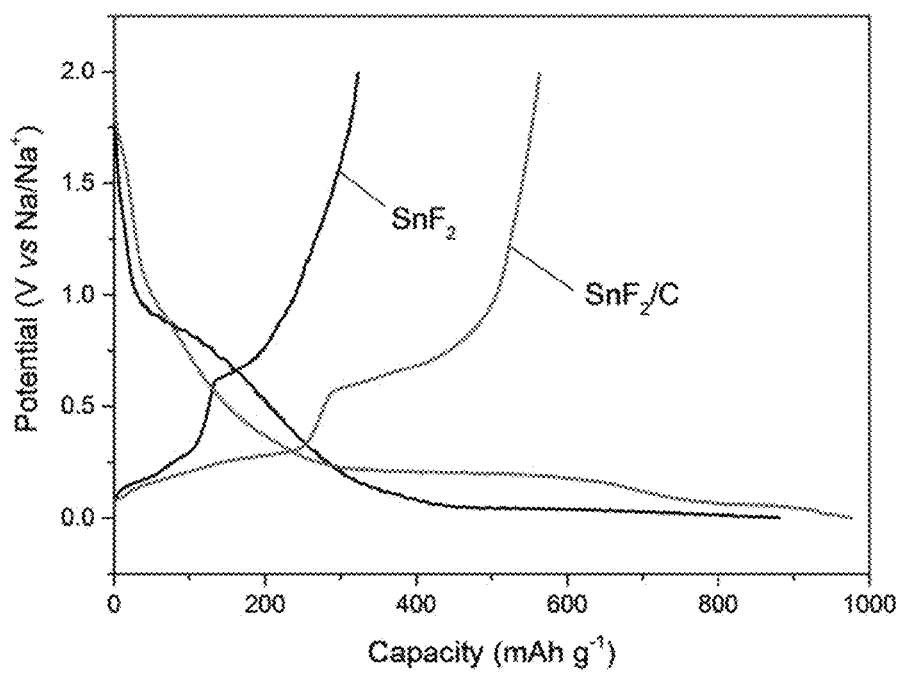
FIG. 3 shows galvanostatic charge/discharge curves of an anode including stannous fluoride ($SnF_2$) produced in Comparative Example 1 and an anode including a stannous fluoride-carbon composite ($SnF_2/C$) produced in Example 1.

FIG. 3 shows galvanostatic charge/discharge curves of the anode including the stannous fluoride (SnF$_2$) produced in Comparative Example 1 and the anode including the stannous fluoride-carbon composite (SnF$_2$/C) produced in Example 1.

The charge/discharge curves show voltages measured at a charge/discharge current density of C/20 (1C: 1189 mAg$^{-1}$) when sodium metal foils were used as counter and reference electrodes.

Referring to FIG. 3, the specific charge capacities of the SnF$_2$ anode and the SnF$_2$/C anode at the first cycle were 881 and 977 mAhg$^{-1}$, respectively. The specific discharge capacities of the SnF$_2$ anode and the SnF$_2$/C anode at the first cycle were found to be 323 and 563 mAhg$^{-1}$, respectively.

The charge/discharge efficiency (58%) of the SnF$_2$/C anode at the first cycle was higher than that (37%) of the SnF$_2$ anode.

From these results, it can be seen that the complexation of SnF$_2$ with the carbonaceous material is effective in suppressing the growth of the solid electrolyte interphase (SEI) and is also effective for reversible intercalation/deintercalation of sodium ions.

The difference between the plateau potentials of the $SnF_2/C$ anode during charge/discharge was smaller. This is because the complexation of $SnF_2$ with the carbonaceous material leads to an increase in the electrical conductivity of the anode material and the ball milling results in a reduction in the particle size of the composite to enhance accessibility to the electrolyte.

Figure 4:
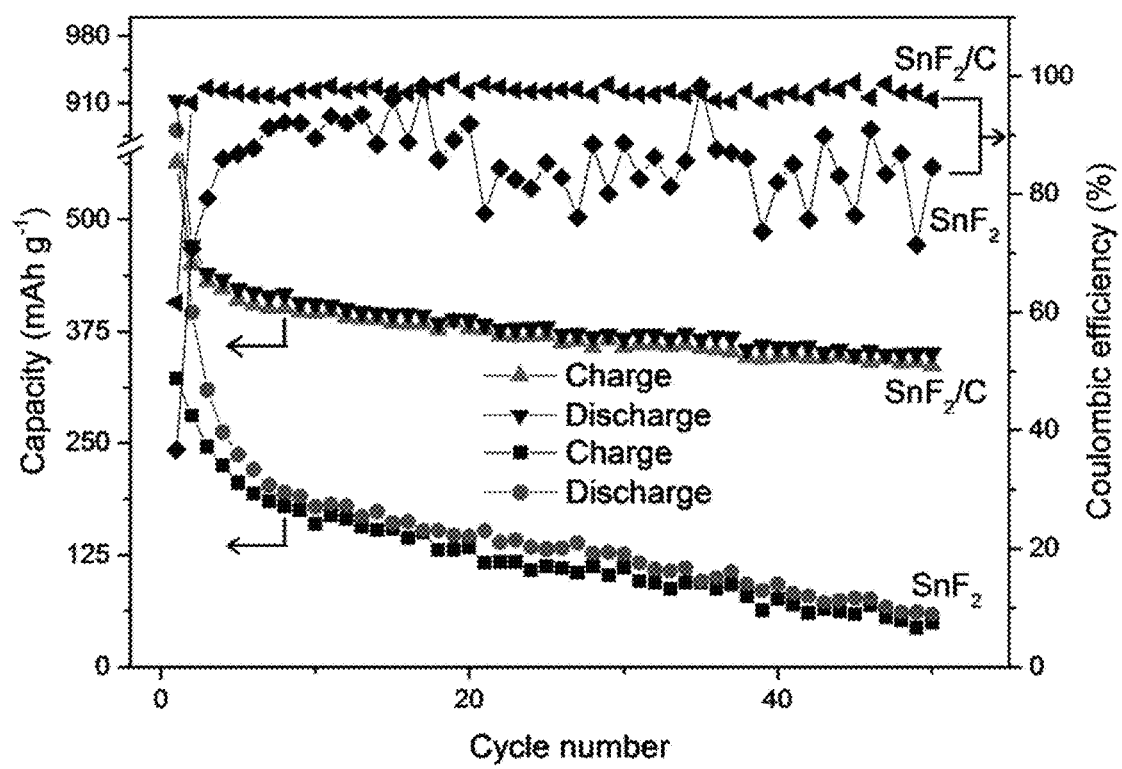
FIG. 4 shows galvanostatic charge/discharge capacity vs. cycle curves of an anode including stannous fluoride ($SnF_2$) produced in Comparative Example 1 and an anode including a stannous fluoride-carbon composite ($SnF_2/C$) produced in Example 1.

FIG. 4 shows galvanostatic charge/discharge capacity vs. cycle curves of the anode including the stannous fluoride ($SnF_2$) produced in Comparative Example 1 and the anode including the stannous fluoride-carbon composite ($SnF_2/C$) produced in Example 1.

Referring to FIG. 4, after 50 cycles of repeated charge/discharge, the $SnF_2$ anode underwent a drastic reduction in discharge capacity from 323 $mAhg^{-1}$ to 49 $mAhg^{-1}$ whereas the $SnF_2/C$ anode underwent a stable reduction in discharge capacity from 563 $mAhg^{-1}$ to 337 $mAhg^{-1}$.

During the charge/discharge cycles, the $SnF_2/C$ anode had charge/discharge efficiencies of at least 95%, which were higher than those of the $SnF_2$ anode.

Figure 5:
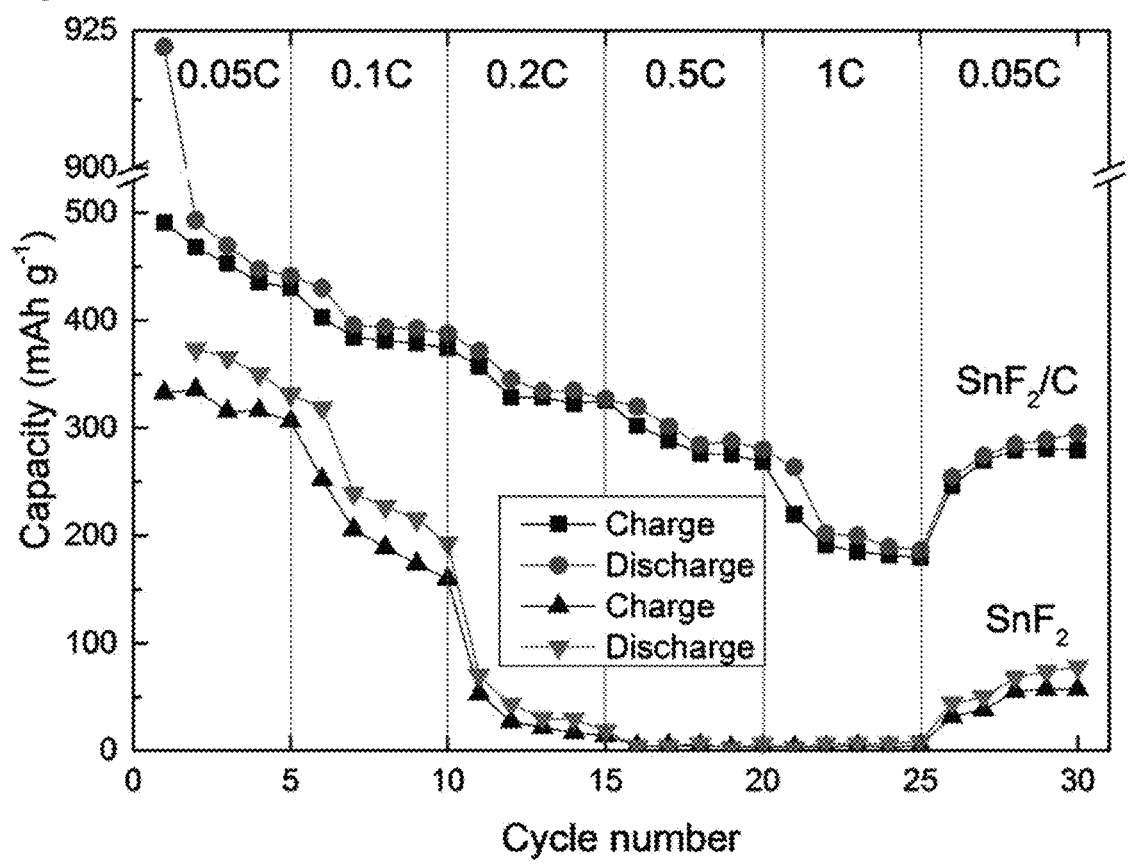
FIG. 5 shows changes in the charge/discharge capacity of an anode including stannous fluoride ($SnF_2$) produced in Comparative Example 1 and an anode including a stannous fluoride-carbon composite ($SnF_2/C$) produced in Example 1 with varying charge/discharge rates.

FIG. 5 shows changes in the charge/discharge capacity of the anode including the stannous fluoride ($SnF_2$) produced in Comparative Example 1 and the anode including the stannous fluoride-carbon composite ($SnF_2/C$) produced in Example 1 with varying charge/discharge rates.

Referring to FIG. 5, the $SnF_2$ anode showed charge capacities of 336, 205, and 53 $mAhg^{-1}$ at charge/discharge rates of 0.05, 0.1, and 0.2 C, respectively. The charge capacity of the $SnF_2$ anode at 0.5 C was converged to zero. In contrast, the $SnF_2/C$ anode showed 490, 384, 329, 288, and 191 $mAhg^{-1}$ at charge/discharge rates of 0.05, 0.1, 0.2, 0.5, and 1 C, respectively.

From these results, it can be confirmed that the charge/discharge capacities of the $SnF_2/C$ anode at all charge/discharge rates are higher than those of the $SnF_2$ anode.

Figure 6:
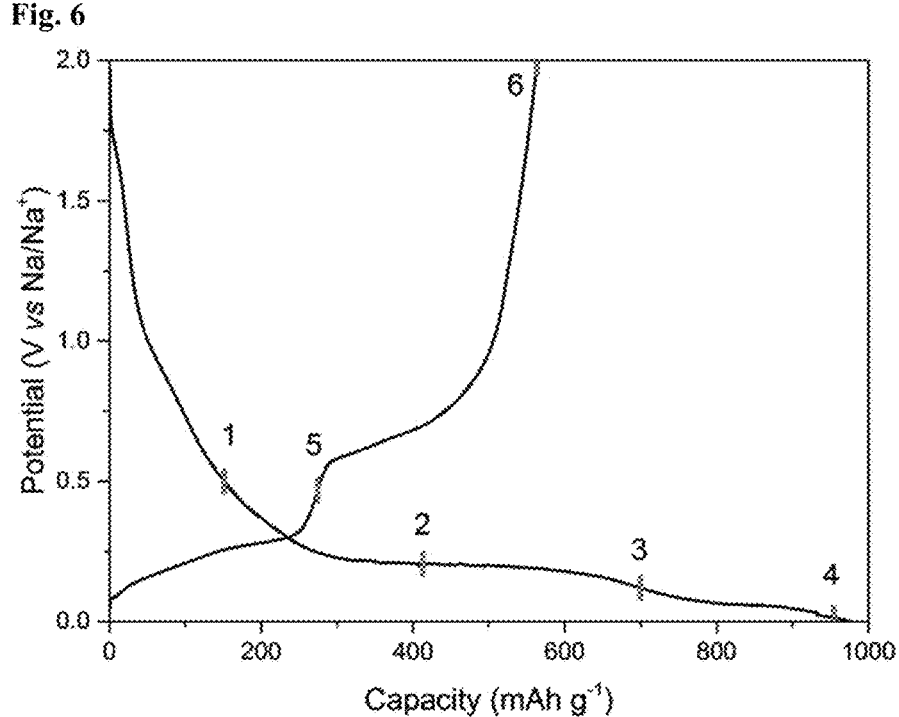
FIG. 6 shows voltages set during charge/discharge to observe changes in the structure of an anode material in an anode including a stannous fluoride-carbon composite ($SnF_2/C$) produced in Example 1.

FIG. 6 shows voltages set during charge/discharge to observe changes in the structure of the anode material in the anode including the stannous fluoride-carbon composite ($SnF_2/C$) produced in Example 1.

The numbers 1, 2, 3, 4, 5, and 6 in FIG. 6 represent voltages at which ex-sity X-ray absorption spectroscopy (XAS) was performed.

Figure 7A:
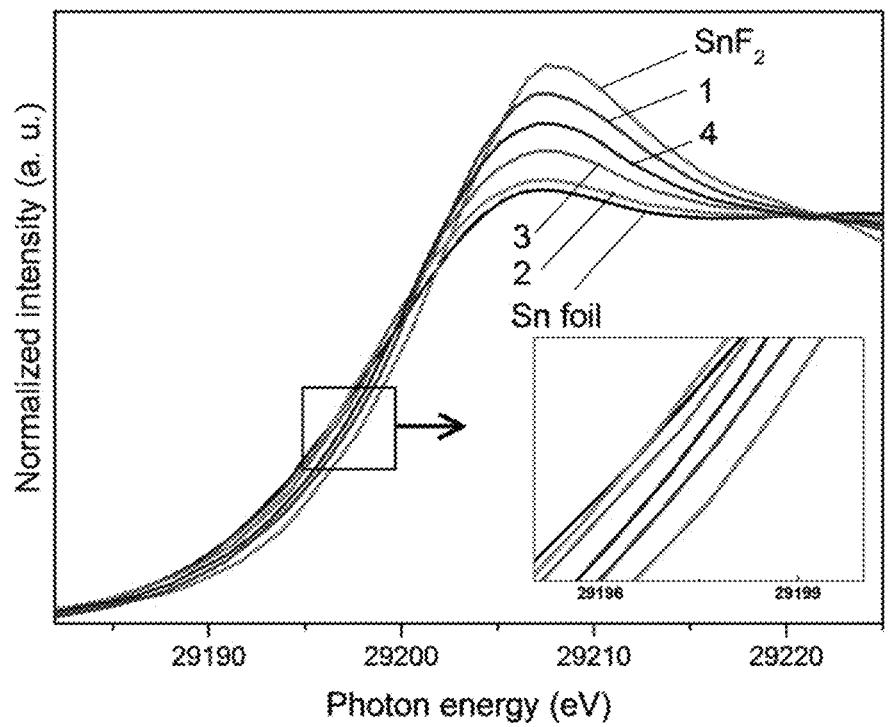
FIGS. 7A and 7B show changes in the structure of an anode material during discharging of an anode including a stannous fluoride-carbon composite ($SnF_2/C$) produced in Example 1, which were measured by X-ray absorption spectroscopy.
Figure 7B:
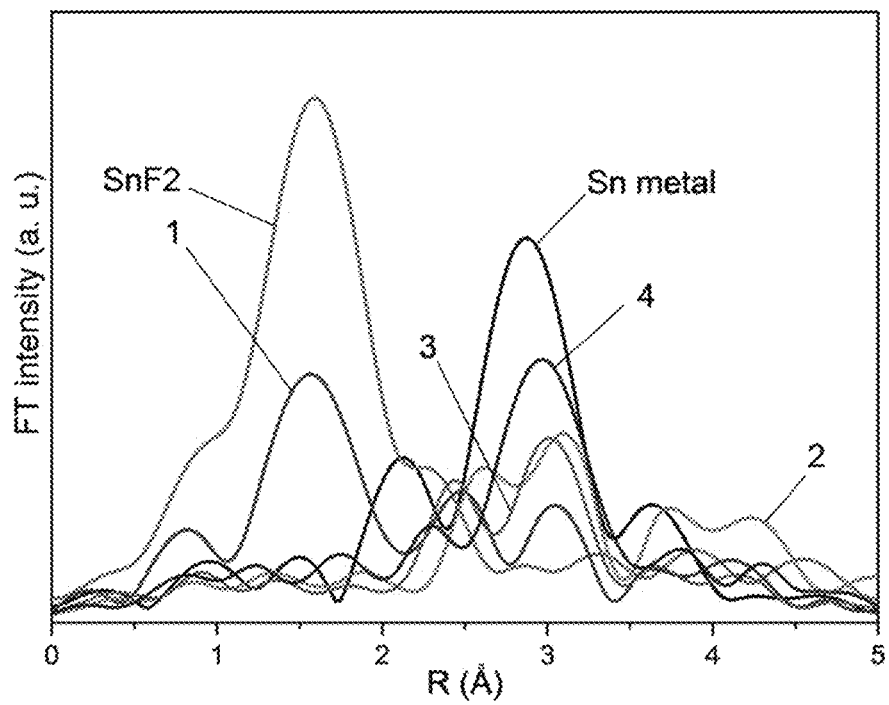

FIGS. 7A and 7B shows changes in the structure of the anode material during discharging of the anode including the stannous fluoride-carbon composite ($SnF_2/C$) produced in Example 1, which were measured by X-ray absorption spectroscopy. Specifically, FIGS. 7A and 7B show X-ray absorption near edge structure (XANES) and extended x-ray absorption fine structure (EXAFS) spectra recorded during intercalation of sodium ions, respectively.

Referring to FIG. 7A, the initial oxidation number of Sn was +2. As the intercalation of sodium ions proceeded, the XANES spectrum continuously shifted to a lower energy level, indicating a decrease in the oxidation number of Sn. The final reaction stage was also confirmed to involve the conversion of $SnF_2$ to Sn metal and NaF. The XANES spectra were compared with that of Sn as the reference metal. As a result, all $Sn^{2+}$ ions were converted to $Sn^0$ metal, which was confirmed from the spectrum 2 of FIG. 7A.

Referring to FIG. 7B, the first peaks observed at 1.5 Å correspond to the Sn—F bond and the peaks observed at 3.4 and 3.9 Å correspond to the Sn—Sn bond. The spectrum 2 reveals complete disappearance of the Sn—F bond, demonstrating the conversion of all $Sn^{2+}$ ions to $Sn^0$ metal at the potential 2 observed in the XANES results. As the potential 2 decreased to the potential 4, continuous intercalation of sodium ions occurred and the XANES spectrum continuously shifted to a higher energy level, indicating that the as-formed $Sn^0$ metal electrochemically reacts again with sodium ions to form $Na_xSn$ alloys. This alloy formation can be demonstrated by increasing intensities of the peaks (corresponding to the Sn—Sn bond) observed at around 3 Å in the EXAFS spectra.

Figure 8A:
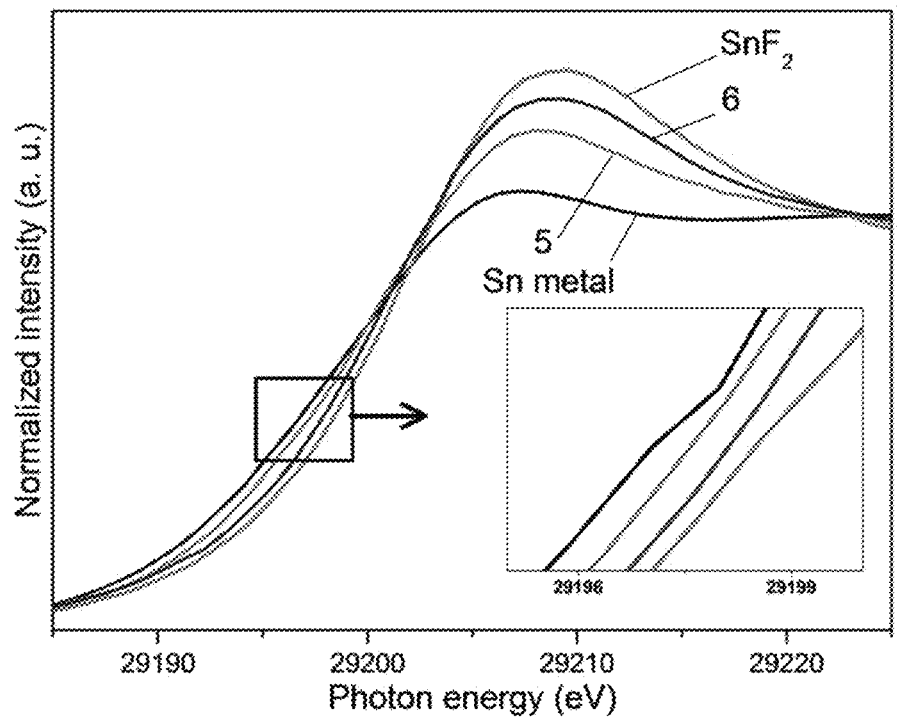
FIGS. 8A and 8B show changes in the structure of an anode material during charging of an anode including a stannous fluoride-carbon composite ($SnF_2/C$) produced in Example 1, which were measured by X-ray absorption spectroscopy.
Figure 8B:
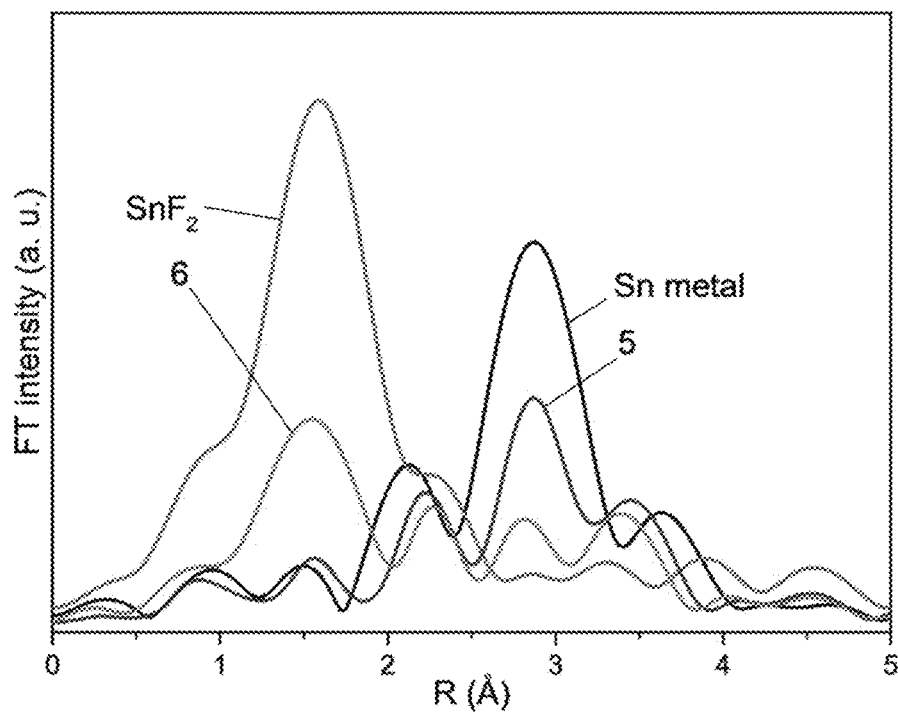

FIGS. 8A and 8B shows changes in the structure of the anode material during charge of the anode including the stannous fluoride-carbon composite ($SnF_2/C$) produced in Example 1, which were measured by X-ray absorption spectroscopy. Specifically, FIGS. 8A and 8B are XANES and EXAFS spectra of the $SnF_2/C$ anode measured during deintercalation of sodium ions, respectively.

Referring to FIGS. 8A and 8B, as the deintercalation of sodium proceeded, the XANES spectrum continuously shifted to a higher energy level and the oxidation number of Sn increased (i.e. Sn was oxidized).

Figure 9:
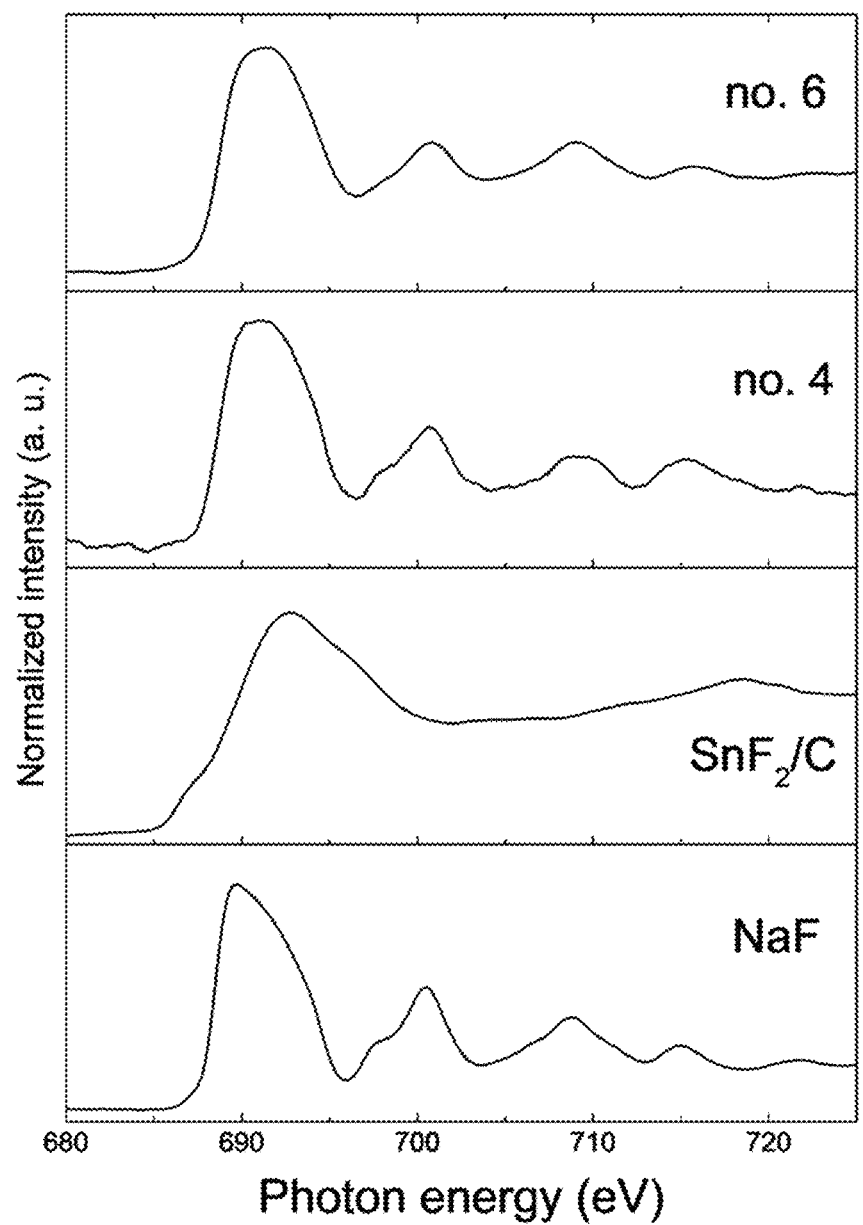
FIG. 9 shows near edge X-ray absorption fine structure (NEXAFS) spectra of a fully discharged sample ("no. 6"), a fully charged sample ("no. 4"), and an uncharged sample ("$SnF_2/C$") of an anode including a stannous fluoride-carbon composite ($SnF_2/C$) produced in Example 1, and NaF as a reference sample.

FIG. 9 shows near edge X-ray absorption fine structure (NEXAFS) spectra of a fully discharged sample ("no. 6"), a fully charged sample ("no. 4"), and an uncharged sample ("$SnF_2/C$") of the anode including the stannous fluoride-carbon composite ($SnF_2/C$) produced in Example 1, and NaF as a reference sample.

Referring to FIG. 9, a main peak was observed at 692 eV (with a shoulder peak at around 686 eV) and a moderate peak was observed at around 718 eV in the uncharged $SnF_2/C$ anode. In the fully charged state ("no. 4"), the main peak shifted to 690 eV and new peaks appeared at around 700, 709, and 715 eV. Comparison of these peaks with those of the NaF reference sample demonstrates the formation of NaF in the fully charged state ("no. 4").

Based on the general technical knowledge at the time of filing the present application and the teachings of the disclosure as well as the above-described embodiments, those skilled in the art will appreciate that the invention can be implemented in other specific forms without changing the technical spirit or essential features of the invention.

The scope of the invention is defined by the appended claims rather than the detailed description of the invention. All changes or modifications or their equivalents made within the meanings and scope of the claims should be construed as falling within the scope of the invention.

What is claimed is:

1. A sodium secondary battery comprising: an anode of the sodium secondary battery,
wherein the anode of the sodium secondary battery comprises a tin fluoride-carbon composite comprises $SnF_2$/C.

2. The sodium secondary battery according to claim 1, wherein the fluoride-carbon composite further comprises a tin fluoride is selected from SnF3, SnF4, and mixtures thereof.

3. The sodium secondary battery according to claim 1, wherein the tin fluoride-carbon composite has a size of 50 to 100 nm.

4. The sodium secondary battery according to claim 1, wherein the tin fluoride-carbon composite is composed of 5 to 30% by weight of the C and 70 to 95% by weight of a tin fluoride.

* * * * *